(12) United States Patent
Vl et al.

(10) Patent No.: US 11,743,274 B2
(45) Date of Patent: Aug. 29, 2023

(54) SYSTEMS AND METHODS FOR FRAUD MANAGEMENT

(71) Applicant: Concentrix Corporation, Fremont, CA (US)

(72) Inventors: Anil Vl, Bangalore (IN); Vasikar Paulraj, Bangalore (IN); Willys Antony, Bangalore (IN); Muthamil Selvan G, Bangalore (IN); Anil Kumar P, Bangalore (IN)

(73) Assignee: Concentrix Corporation, Fremont, CA (US)

( * ) Notice: Subject to any disclaimer, the term of this patent is extended or adjusted under 35 U.S.C. 154(b) by 8 days.

(21) Appl. No.: 17/157,054

(22) Filed: Jan. 25, 2021

(65) Prior Publication Data

US 2021/0234876 A1 Jul. 29, 2021

(30) Foreign Application Priority Data

Jan. 24, 2020 (IN) .............................. 202011003277

(51) Int. Cl.
*H04L 9/40* (2022.01)
*G06Q 30/018* (2023.01)
*G06Q 50/26* (2012.01)

(52) U.S. Cl.
CPC ...... *H04L 63/1416* (2013.01); *H04L 63/1441* (2013.01); *H04L 63/20* (2013.01); *G06Q 30/0185* (2013.01); *G06Q 50/26* (2013.01)

(58) Field of Classification Search
CPC .. H04L 63/1416; H04L 63/1441; H04L 63/20
USPC .......................................................... 726/23
See application file for complete search history.

(56) References Cited

U.S. PATENT DOCUMENTS

| 10,091,349 | B1* | 10/2018 | Rao ..................... H04M 3/2218 |
| 11,030,562 | B1* | 6/2021 | Dean ..................... G06Q 50/265 |
| 2008/0271143 | A1 | 10/2008 | Stephens et al. |
| 2011/0225650 | A1 | 9/2011 | Margolies et al. |
| 2014/0047544 | A1* | 2/2014 | Jakobsson ............... G06F 21/55 726/23 |

(Continued)

OTHER PUBLICATIONS

Search Report for International Patent Application No. PCT/US2021/014894 dated Apr. 9, 2021; 1 page.

*Primary Examiner* — Teshome Hailu
(74) *Attorney, Agent, or Firm* — Dority & Manning, P.A.

(57) ABSTRACT

Systems and methods for fraud management are provided. A fraud management system can include a data gatherer operable with a plurality of agent computers for collecting agent activity data from the plurality of agent computers. System can include a fraud rules database containing fraud rules and a fraud management computing system. The fraud management computing system can be in communication with the data gatherer and the fraud rules database. The fraud management computing system can also include, processors and memory devices. The memory devices store instructions that when executed by the processors cause the processors to perform operations. The operations include obtaining the agent activity data using the data gatherer pursuant to collection rules, comparing the agent activity data to the fraud rules, determining whether agent fraud event(s) have occurred based on the comparison and providing fraud alert data based upon the agent fraud event(s).

19 Claims, 4 Drawing Sheets

(56) References Cited

U.S. PATENT DOCUMENTS

2018/0027006 A1    1/2018  Zimmermann et al.
2018/0308099 A1*  10/2018  Binns ................. G06Q 20/4016
2019/0261222 A1*   8/2019  Raleigh ................ H04W 28/10

* cited by examiner

SYSTEMS AND METHODS FOR FRAUD MANAGEMENT

CROSS-REFERENCE TO RELATED APPLICATION

The present application claims the filing benefit of India Provisional Patent Application Serial Number 202011003277 having a filing date of Jan. 24, 2020 and entitled "Fraud Management System" the disclosure of which is hereby incorporated by reference in its entirety.

FIELD

The present subject matter relates generally to systems and methods for monitoring and detecting fraudulent activity, including fraudulent agent activity occurring on locationally distinct or remote agent computing devices.

BACKGROUND

Companies, and particularly medium and large companies, that have many users or agents accessing or working through their computer system(s), have a need to monitor agent actions for potentially fraudulent activity. Potentially fraudulent activity may be in the form of agents who improperly access or utilize a company's computer system or authorized users attempting to defraud the company. Regardless, it may be important to quickly identify potentially fraudulent activity, such that intervention may occur and/or any resulting damage to the company or customers (e.g., consumers, business customers, prospective customers, employees, candidates for employment, other individuals contacted by or on behalf of company) may be minimized.

Traditionally, in order to monitor for potentially fraudulent activity in real time, one or more persons would be needed to personally monitor the activity in question. Otherwise, software was required to operate specifically with an individual company's local computer system to collect data, which may be reviewed by persons, at set intervals well after any potential fraud activity may have occurred by an agent, to determine whether or not any fraudulent activity may have taken place. This existing methodology presents drawbacks and difficulties with respect to implementation particularly when utilized with significant numbers of employees or agents or when utilized with user or agent activity occurring on locationally distinct computing devices or remote workstations. These existing methodologies also present challenges in that they may not be effectively implemented or effective at detecting fraudulent activity due to lapses in time or because the fraud is conducted on locationally distinct remote computing devices or workstations. Additionally, existing methodologies are time consuming and may not be effective for catching fraudulent activity before the damage from the fraudulent activity has occurred, become significant or irreversible.

Accordingly, a fraud management system that addresses one or more of the challenges noted above or which provides additional features, and versatility would be useful and welcomed.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a fraud management system. The fraud management system (e.g., FMS 100) can include an agent data gatherer (e.g., Agent Data Gatherer 152) operable with a plurality of agent computing devices (e.g., agent computing devices 150) for collecting and transmitting agent activity data (e.g., agent data 112) from each of the plurality of agent computing devices (e.g., agent computing devices 150). Fraud management system can also include a fraud rules database (e.g., database 125) containing one or more fraud rules (e.g., fraud rules 132). Fraud management system can also include a fraud management computing system (e.g., FMS computing system 110) in communication with the agent data gatherer 152 and the fraud rules database 125.

The fraud management computing system can include, one or more processors and one or more memory devices, the one or more memory devices configured to store the one or more fraud rules and store instructions that when executed by the one or more processors cause the one or more processors to perform operations. The operations can include obtaining the agent activity data (e.g., agent data 112) transmitted by the agent data gatherer 152. The operations can also include comparing the agent activity data (e.g., agent data 112) to the one or more fraud rules 132. The operations can also include determining whether one or more agent fraud events 137 have occurred based, at least in part, on the comparison. Additionally, the operations can include providing a fraud alert 165 based upon each of the one or more agent fraud events 138.

In some example embodiments, the data gather 152 of fraud management system 100 can include software installed on each of the plurality of agent computing devices (e.g., device 150) which collects agent activity data (e.g., agent data 112) based, at least in part, on one or more collection rules 154. The one or more collection rules 154 can be based on a plurality of agent inputs that may be received by any one of the plurality of agent computing devices 150.

In other example embodiments, the one or more fraud rules 132 are based on one or more agent computing commands, which are symptomatic of one of the agent fraud events being performed on one or more of the agent computing devices 150. The fraud management system can also include a fraud severity level 207 corresponding to each of the fraud rules 132. The operations executed by the one or more processors of the fraud management system can include determining a fraud severity level 207 for the each of the one or more agent fraud events 138 and determining if the fraud severity level 207 corresponding to any of the one or more agent fraud events 138 exceeds a severity level threshold 209.

In some instances, when the fraud severity level 207 corresponding to one or more agent fraud events 138 is equal to or exceeds the severity level threshold 209, the operations executed by the one or more processors can further include generating a quarantine command and transmitting the quarantine command to one or more of the agent computing devices 150.

In other instances when a fraud severity level 207 corresponds to each of the fraud rules 132 the operations executed by the one or more processors can include determining a fraud severity level 207 for each of the one or more agent fraud events 138 and comparing fraud severity level 207 for each of the one or more agent fraud events 138 to a severity level threshold 209. The operations can also include generating an aggregate fraud level 211 when the fraud severity level 207 for all of the agent fraud events 138 is less than the severity level threshold 209. Thereafter, the processors may perform operations comparing the aggregate fraud level 211 to the severity level threshold 209. The processors can then generate a quarantine command when the aggregate fraud level 211 meets or exceeds the severity level threshold 209 and transmit the quarantine command to one or more of the agent computing devices 150.

In some example embodiments of the fraud management system the aggregate fraud level 211 can be the sum of the fraud severity levels 207 for each of the one or more agent fraud events 138. In other example embodiments, the aggregate fraud level 211 can be the average of the fraud severity levels 207 for each of the one or more agent fraud events 138.

In some embodiments of the fraud management system 100, the operations executed by the one or more processors can include determining a fraud severity level 207 for each of the one or more agent fraud events 138, comparing fraud severity level 207 for each of the one or more fraud events 138 to a severity level threshold 209. The operations can include generating an aggregate fraud level 211 when the fraud severity level 207 for all of the agent fraud events 138 is less than the severity level threshold 209. The operations may also include comparing the aggregate fraud level 211 to the severity level threshold 209 and modifying the fraud severity level 207 corresponding to each of the one or more agent fraud events 138 or fraud severity level 207 corresponding to each fraud rule 132, when the aggregate fraud level 211 is less than the severity level threshold 209.

Another example embodiment according to the present disclosure can be a computer-implemented method. The method can include generating, by a computing system comprising one or more computing devices, one or more fraud rules. The method can also include obtaining, by the computing system, agent activity data from a plurality of agent computing devices, where the agent activity data is obtained based, at least in part, on one or more collection rules. Thereafter, the method can involve comparing the agent activity data to the one or more fraud rules and determining an occurrence of one or more agent fraud events based, at least in part, on a comparison of the agent activity data and the one or more fraud rules. Thereafter, the method can include providing a fraud alert based upon each of the one or more agent fraud events.

Yet another example embodiment according to the present disclosure, can be one or more tangible, non-transitory computer-readable media storing computer-readable instructions that when executed by one or more processors cause the one or more processors to perform operations. The operations can include generating, by a computing system comprising one or more computing devices, one or more fraud rules. The operations can include obtaining, by the computing system, agent activity data from a plurality of agent computers, where the agent activity data is obtained based, at least in part, on one or more collection rules. The operations can also include determining an occurrence of one or more agent fraud events based, at least in part, on a comparison of the agent activity data and the one or more fraud rules, and providing, by the computing system, data indicative of the one or more agent fraud events.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The singular forms "a", "an", and "the" include plural references unless the context clearly dictates otherwise. As used herein, terms of approximation, such as "approximately," "substantially," or "about," refer to being within a ten percent margin of error.

Aspects of the present disclosure are directed to systems and methods for fraud management. The systems and methods for fraud management can detect and manage fraud events caused by agents (e.g., employees, users, contractors, or representatives of company or its partner entities) while operating one or more agent computing devices (e.g., individual computers, laptops, tablets, smartphones or workstations, accessed by agents). The one or more agent computing devices work as part of or interface with the local computer system of a company and/or a partner entity (e.g., a third-party entity that may be an operator or administrator of the fraud management system which is the subject of the present disclosure, business processing outsourced contact centers (BPOs) or other third-party service providers). A company's or partner entity's local computer system can include computers and computing devices, such as laptops, desktop computers, servers, cloud-service(s), space on a cloud server or the like, with which the company or partner entity conducts business or the company or partner entity otherwise utilize for performing business functions and data storage for the operation of or associated with the business operations.

In particular, aspects of the present disclosure are directed to a Fraud Management System. A Fraud Management System (FMS) according to certain example embodiments of the present disclosure can include a FMS Computing System which operates to identify fraud events occurring on a plurality of individual user or agent computing devices which are part of or interface with a company's or partner entity's computer system. A fraud event, for example, can be a misuse of the agent computing device which may harm the company or a customer of the company or compromise the security of information on the company's or partner entity's computer system. For example, a fraud event, which can be identified by a FMS according to the present disclosure, can be the misuse of customer information by an agent (e.g., accessing customer information when an agent is not working on a task or service ticket related to said customer; utilizing the copy and paste function when customer payment information is being input by the agent; or entry of credit card information into programs, such as MSWord, Excel, NotePad, etc., which are incompatible with proper use of credit card information).

A FMS according to example embodiments of the present disclosure can be employed in various industries and applications which utilize a plurality of agent computing devices, such as, for example, companies in the customer service industry (e.g., contact centers) having hundreds of agents, employees, or contractors providing services by using individual agent computing devices which interface with a partner entity's and/or company's computer system or network (e.g., LAN).

A FMS according to example embodiments of the present disclosure can include a Data Gatherer feature; a Fraud Detection feature; and a Fraud Reporting feature which are described in further detail herein. These and other features of a FMS of the present disclosures can detect potentially fraudulent user or agent actions, analyze or process the potentially fraudulent actions, determine whether one or more fraud events have occurred, and perform operations in response to determining that one or more fraud events have occurred.

Referring now to the figures, example aspects of the present disclosure will be discussed in greater detail.

Figure 1:
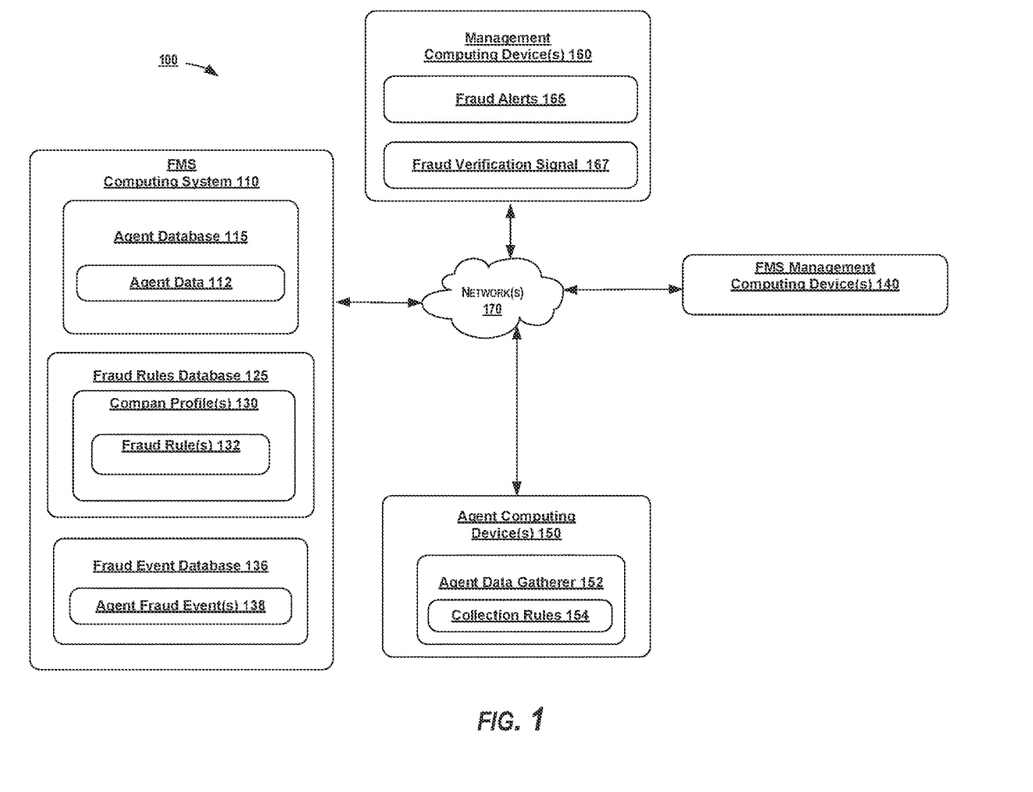
FIG. 1 depicts a fraud management system according to example embodiments of the present disclosure.

More particularly, FIG. 1 depicts a Fraud Management System (FMS) 100 according to example embodiments of the present disclosure. The FMS 100 can include a FMS Computing System 110 and one or more FMS Management Computing Devices 140. FMS Computing System 110 and FMS Management Computing Device 140 can each include one or more processors and one or more non-transitory computer-readable media that collectively store instructions (described in further detail herein, such as storing Fraud Rules 132 in FMS Computing System 110) that, when executed by the one or more processors, cause the system/devices to perform operations. The operations performed by the FMS 100, can include any of operations disclosed herein, with reference to each respective system/device, to determine, manage, store, distribute, and/or provide dynamic fraud detection and fraud management for a plurality of agent computing devices 150 on a real-time or near real-time basis relative to the occurrence of fraud events on the agent computing devices 150.

In addition, or alternatively, the FMS Computing System 110 can be a server or other computing device, which can be part of or separate from the company's local computer system, that includes one or more interactive interfaces such as, for example, one or more display devices (e.g., with a respective user interface, etc.), one or more input devices (e.g., a touch user interface, one or more microphones, tactile buttons, etc.), one or more output devices (e.g., such as the respective user interface, one or more speakers, etc.), etc. Similarly, or alternatively, the FMS Management Computing Devices 140 can be a laptop, tablet, smartphone, desktop, PC or other computer that includes one or more interactive interfaces such as, for example, one or more display devices (e.g., with a respective user interface, etc.), one or more input devices (e.g., a touch user interface, one or more microphones, tactile buttons, etc.), one or more output devices (e.g., such as the respective user interface, one or more speakers, etc.), etc. In this manner, each of the system(s)/device(s) 110 and 140 can interact (e.g., provide/receive data) with one another and/or a user of FMS Management Computing Device 140. These features also allow FMS Computing System 110 to interact (e.g., provide or receive data) with one or more Agent Computing Devices 150 and one or more Management Computing Devices 160.

As used herein, the term "real-time" refers to computing occurring without any substantial built-in delays, and occurring substantially at the same time with the exception of any delays due to processing time, telecommunications delays, and the like. In such a manner, the total time from the potentially fraudulent activity occurring at the agent's computer 150 to such potentially fraudulent activity being provided to the FMS Computing System 110, identified as potentially fraudulent activity, and provided to a manager by way of alert 165 may be minimized, such that corrective action may occur quickly. For example, the total time from the potentially fraudulent activity occurring at the agent's computer 150 to such potentially fraudulent activity (e.g., the Agent Data 112) being provided to the FMS Computing System 110, identified as potentially fraudulent activity, and provided to a manager (or Management Computing Device 160) by way of alert 165 may be less than about 15 minutes, such as less than about 10 minutes, such as less than about 8 minutes, such as less than about 5 minutes, such as less than about 3 minutes, such as less than about 2 minutes, such as less than about 1 minute.

Each of Agent Computing Devices 150 and Management Computing Devices 160 can be a laptop, desktop, PC or other computer that includes one or more interactive interfaces such as, for example, one or more display devices (e.g., with a respective user interface, etc.), one or more input devices (e.g., a touch user interface, one or more microphones, tactile buttons, etc.), one or more output devices (e.g., such as the respective user interface, one or more speakers, etc.), etc. In this manner, each of the system(s)/device(s) 150 and 160 can interact (e.g., provide/receive data) with FMS Computing System 110 and/or FMS Management Computing Device 140 or a user thereof. Each of the FMS Computing System 110 and/or device(s) 140, 150, 160 can communicate via one or more network(s) 170.

As described in further detail herein, FMS 100 can gather data (Agent Data 112) indicative of actions occurring on one or more Agent Computing Devices 150. FMS Computing System 110 can receive, analyze, process and store Agent Data 112 based, at least in part, on one or more Fraud Rules 132. FMS Computing System 110 can perform operations to determine whether one or more fraud events 138 have occurred on any of the one or more agent computing devices 150, based on an analysis (i.e., a comparison) of the Agent Data 112 and the Fraud Rules 132. FMS 100 can perform operations in response to the determination that one or more fraud events 138 have occurred on or through use of the one or more agent computing devices 150.

FMS 100, as depicted in FIG. 1, is an example embodiment of the present disclosure. FMS 100 can include a Data Gatherer feature 152; a Fraud Detection feature (e.g., FMS Computing System 110, Fraud Rules Database 125 and Fraud Event Database 136); and a Fraud Reporting feature (e.g., FMS Computing System 110, Fraud Alerts 165 and Fraud Verification Signals 167) which are described in further detail herein. These and other features of FMS 100 can detect and dynamically manage fraudulent user or agent actions occurring on one or more of the agent computing devices 150. Dynamic management of the fraudulent agent actions can be performed by FMS Computing System 110, which analyzes or process the agent data 112 which may be indicative of potentially fraudulent actions, determines whether one or more fraud events have occurred based on said analysis and performs operations in response to determining that one or more fraud events have occurred.

Data Gatherer feature 152 of FMS 100 can recognize, record, and transmit Agent Data 112 indicative of a potential fraudulent actions or events occurring on the individual Agent Computing Devices 150. Agent Data 112 is transmitted, through network 170, to the FMS Computing System 110. FMS Computing System 110 houses or contains certain aspects of the Fraud Detection feature and Fraud Reporting feature of FMS 100. Agent Data 112 is stored within agent database 115 contained within FMS Computing System 110. Agent Database 115 can include one or more processors and one or more non-transitory computer-readable media that collectively receive and store Agent Data 112 from Agent Computing Devices 150.

FMS Computing System 110 receives Agent Data 112 from the Data Gatherer 152 installed on the one or more individual Agent Computing Devices 150. Data Gatherer 152 may be or include software installed on each of the Agent Computing Devices 150 (e.g., installed on each employee desktop computers, laptop, employee/agent virtual desktops or workstations etc.). Data Gatherer 152 may be software which operates such that it is not detectible and does not alert agent of its operation. In this way, Data Gatherer 152 may capture data indicative of activity performed on each of the Agent Computing Devices 150 by each agent. The software of the Data Gatherer 152 may be a standalone software product that captures the Agent Data 112. Agent Data 112 may be identified or collected by Data Gatherer 152 based on a set of Collection Rules 154. Collection Rules 154 may correspond to certain pre-defined activities that the agent may perform on the Agent Computing Device 150, including, e.g., keystrokes or mouse clicks (or other data received from a user's peripheral), uploads, downloads, entries provided in certain programs loaded on the computer, internet activity, etc. It will be appreciated that the software for the Data Gatherer 152 need not be specifically designed to operate with a particular computer system of the company. Rather, Data Gatherer 152 may use Collection Rules 154 to monitor and gather data related to almost any activity that can be performed on the individual Agent Computing Device(s) 150. Alternatively, the software for the Data Gatherer 152 may be a custom-tailored software including Collection Rules 154 that are narrowing defined to gather Agent Data 112 related to specific actions, precisely defined by company as areas of likely fraud activity, that can be performed on Agent Computing Device 150 unique to the company.

Data Gatherer 152 may collect and transmit Agent Data 112 in real time or near real time in relation to the activity which is occurring on the individual Agent Computing Device(s) 150 to which the Agent Data 112 corresponds. Through the Data Gather feature 152, Agent Data 112 is collected based on the Collection Rules 154. As described broadly hereinabove, Collection Rules 154 can be based on company entity preferences, or requirements. Alternatively, Collection Rules 154 can be based on the specific work/job responsibilities of each agent of the company entity. For instance, the company preferences upon which the Collection Rules 154 can be based can include collection of data based upon intervals of time (e.g., collecting Agent Data 112 every 5, 30, 60 or 90 seconds, or at some other time interval; or when tasks are performed on agent computing system 150 outside of defined work or business hours), based upon the simultaneous use of certain programs by an agent (e.g., using a program where the copy and paste function is available while agent simultaneously utilizes a program requiring the input of sensitive customer information, such as customer credit card information), and/or based on certain keystrokes or actions performed by an agent (e.g., such as, for example, an agent accessing certain customer information or customer databases when agent is not performing a customer related task or service ticket, or an agent is entering data indicative of a customer credit card number when agent is not performing a customer related task, actively providing customer service or support in response to a customer service ticket). In this way, Data Gatherer 152 does not function to indiscriminately gather Agent Data 112 from Agent Computing Devices 150, but rather selectively and dynamically gathers Agent Data 112. In some embodiments, Collection Rules 154 can restrict the gathering Agent Data 112 to periods when Agent Computing Devices 150 are operating any Microsoft Windows native applications, including Notepad, calculator, or MS Office Suite, or internet-based applications (e.g., web browsers).

Fraud Detection features of FMS 100 include FMS Computing System 110 performing operations including receipt, analysis, and processing of Agent Data 112 based, at least in part, on Fraud Rules 132. More specifically, FMS Computing System 110 can compare Agent Data 112 to the Fraud Rules 132 to determine whether the Agent Data 112 is indicative of one or more fraud events having occurred at Agent Computing Devices 150. Fraud Rules 132 are stored within a Fraud Rules Database 125 within FMS Computing System 110. Fraud Rules 132 can be transmitted to and stored in Fraud Rules Database 125 from FMS Management Computing Devices 140. Fraud Rules Database 125 can include one or more processors and one or more non-transitory computer-readable media that collectively receive and store a plurality of Fraud Rules 132. Fraud Rules 132 are organized within Fraud Rules Database 125 and segregated into one or more Company Profiles 130. Each of the plurality of Company Profiles 130 contains a set of Fraud Rules 132 which is specific to a particular company for whom Agent Computing Devices 150 are being monitored by FMS 100. In this way, FMS 100 can monitor fraudulent activity from Agent Computing Devices 150 operated by multiple companies and apply a unique set of Fraud Rules 132 tailored to each of the companies.

Fraud Rules 132 may be an action or series of actions which are indicative of a fraud event being performed on an Agent Computing Device 150. For example, a non-exhaustive list of example Fraud Rules 132 and corresponding Agent Data 112 which would satisfy the Fraud Rules 132 and the Fraud Severity Level 207 corresponding to a violation of each Fraud Rule 132 are shown below in Table 1.

TABLE 1

| Fraud Rule 132 | Agent Data 112 Satisfying Fraud Rule | Fraud Severity Level 207 |
|---|---|---|
| Database Access Rule | Access of customer information database without customer service tasks (e.g., on customer service call) or service ticket (requiring action by agent); accesses database to search for high-profile customers (e.g., celebrities) | 5 |
| Skip Function Violation | Agents utilize "skip" button or feature to bypass customer contact or to bypass required task on a service ticket | 4 |
| Time Access Rule-A | Access of programs outside of agent's assigned work hours. | 4 |
| Time Access Rule-B | Agent logon outside of agent's assigned work hours. | 1 |
| Time Access Rules-C | Incorrect Agent logon password entered more than 3 times in a period of 5 minutes or less. | 3 |
| Browser URL Bar Usage Rule | Credit Card Number entered in URL address bar; or Email Address entered in URL address bar; or Social Security number entered in URL address Bar. | 5 |
| Calculator Usage Rule | Credit Card Number entered in URL address bar; or Social Security number entered in URL address Bar. | 5 |
| Excel Usage Rule-A | Credit Card Number entered in MS Excel; or Social Security number entered in MS Excel. | 5 |
| Excel Usage Rule-B | Customer account credentials entered in MS Excel. | 2 |
| Excel Usage Rule-C | Customer phone number entered in MS Excel | 1 |
| Logon Process Rule | Logon attempted using an invalid Login ID | 1 |
| Screenshot Usage Rule | Usage of Windows Snipping Tool, screenshot functions or Print Screen functions. | 3 |
| MSWord Business Rule-A | Credit Card Number entered in MS Word; or Social Security number entered in MS Word. | 5 |
| MSWord Business Rule-B | Customer account credentials entered in MS Word | 2 |
| MSWord Business Rule-C | Customer phone number entered in MS Word | 1 |
| Notepad Business Rule-A | Credit Card Number entered in Notepad; or Social Security number entered in Notepad. | 5 |
| MSWord Business Rule-B | Customer account credentials entered in Notepad | 2 |
| MSWord Business Rule-C | Customer phone number entered in Notepad | 1 |
| Word Pad Business Rule-A | Credit Card Number entered in Word Pad; or Social Security number entered in Word Pad. | 5 |
| Word Pad Business Rule-B | Customer account credentials entered in Word Pad | 2 |
| Word Pad Business Rule-C | Customer phone number entered in Word Pad | 1 |
| Employee Break/ Idle Rule | Employee remains logged off of system for longer than allotted break-time. | 2 |

To dynamically detect and manage fraud events, FMS Computing System 110 compares Agent Data 112 to Fraud Rules 132. If FMS Computing System 110 determines that the Agent Data 112 meets or satisfies one or more of the Fraud Rules 132, the FMS Computing System 110 generates a signal indicative of the occurrence of an Agent Fraud Event 138. In response to the determination that an Agent Fraud Event 138 has occurred, FMS Computing System 110 can perform operations. The operations performed by the FMS Computing System 110 can include issuing Fraud Alerts 165 to customer management of said one or more fraud events, issuing fraud verification signals 167 to customer management and/or dynamically managing (e.g., updating or modifying) the one or more Fraud Rules 132 or corresponding Fraud Severity Level 207 as described further herein.

In some example embodiments, each Agent Fraud Event 138 can be assigned a corresponding Fraud Severity Level 207. The Fraud Severity Level 207 is the relative significance or severity of one Agent Fraud Event 138 as compared to another Agent Fraud Event 138. FMS Computing system 110 can perform operations such that the occurrence of each Agent Fraud Event 138 and Fraud Severity Level 207 associated therewith are stored within Fraud Event Database 136. Agent Fraud Event(s) 138 are stored and categorized within Fraud Event Database 136 based, at least in part, on the Agent Computing Device 150 from which the Agent Fraud Event 138 emanated.

In response to determining that an Agent Fraud Event 138 has occurred, FMS Computing System 110 can perform operations including generating a Fraud Alert 165 corresponding to each Agent Fraud Event 138. Each Fraud Alert 165 can be transmitted to the Management Computing Devices 160 and/or FMS Management Computing Devices 140. Fraud Alert 165 can be an email or other notice transmitted from FMS Computing System 110 via network 170 to Management Computing Device 160 or FMS Management Computing Devices 140. Fraud Alert 165 provides information to representatives/management of the company or partner entity regarding the detected Agent Fraud Event 138, including, e.g., the identity of agent performing the fraudulent activity and information concerning the agent activity meeting one or more of the Fraud Rules 132. In some embodiments, Fraud Alert 165 can be a visual or auditory indicator displayed on an interactive interface of Management Computing Device 160 such as, for example, one or more display devices (e.g., with a respective user interface, etc.), or produced by one or more output devices (e.g., such as the respective user interface, one or more speakers, etc.) of Management Computing Device(s) 160.

In response to determining that an Agent Fraud Event 138 has occurred, FMS Computing System 110 can also generate a Fraud Verification Signal 167. Fraud Verification Signal 167 can be transmitted to the Management Computing Devices 160 through network 170. Fraud Verification Signal 167 can be an email or other notice transmitted from FMS Computing System 110 via network 170 to Management Computing Device 160 which requests verification of the accuracy of the Agent Fraud Event 138 (e.g., confirmation from the company or partner entity that the agent fraud event 138 occurred based a review by management personnel), by the company or partner entity. In some embodiments, verification of the accuracy of the Agent Fraud Event 138 can be utilized to update dynamically and automatically one or more of the Fraud Rules and/or the Fraud Severity Level. For example, if one or more Agent Fraud Events 138 with a corresponding Fraud Severity Level 207 of less than 5 are detected and/or verified by the company or partner entity within a specified period of time (i.e., agent fraud events and/or verification thereof occur during the length of time representing a single work shift of agent), FMS Computing System 110 can automatically update (e.g., increase) the Fraud Severity Level 207 corresponding to one or more of the Fraud Rules 132.

Figure 2:
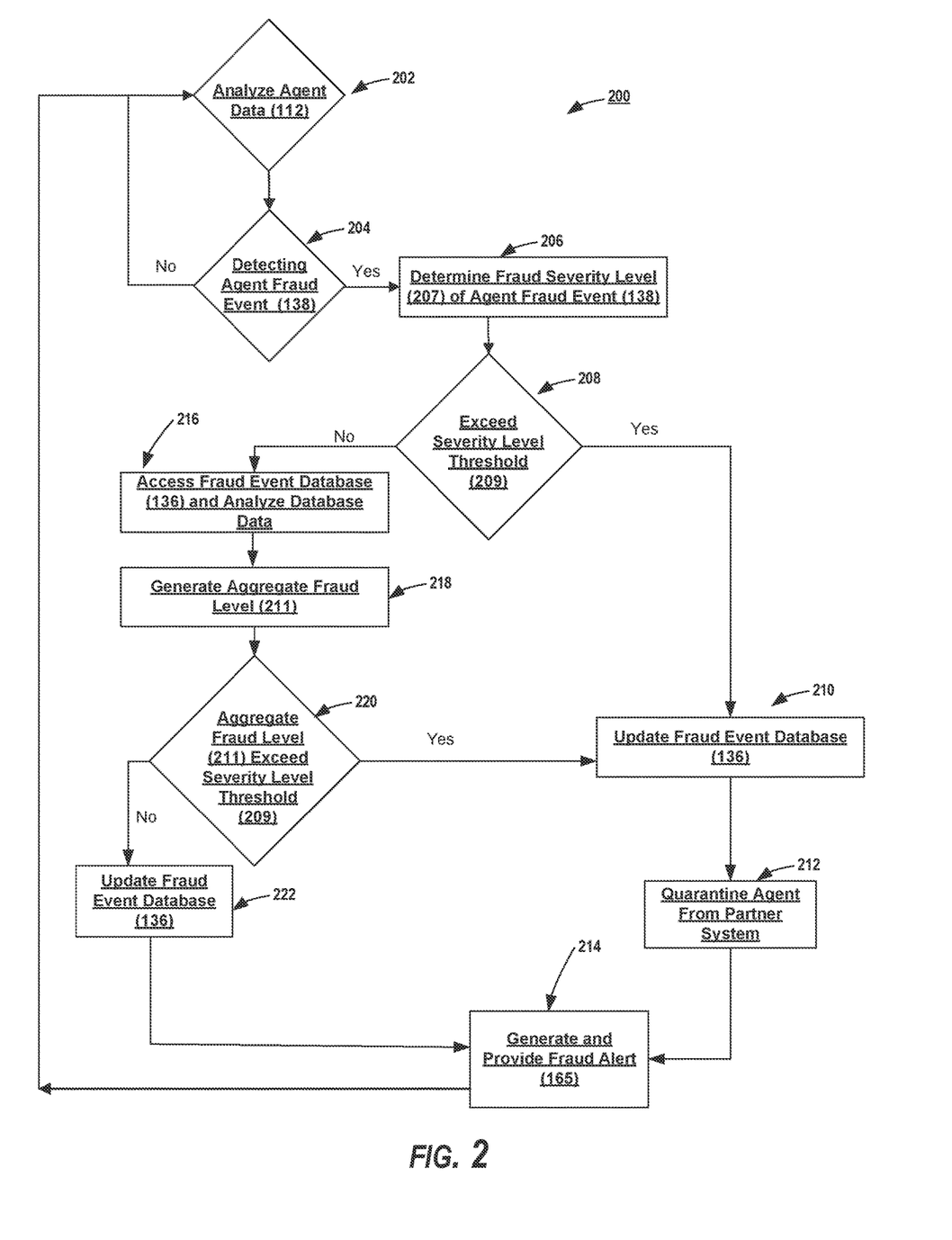
FIG. 2 depicts a flow diagram for dynamically updating the fraud event database and quarantining an agent according to example embodiments of the present disclosure.

FIG. 2 depicts a flow diagram 200 for a method of dynamically updating the fraud event database 136, fraud rules 132 and terminating an agent's eligibility to access to company's or partner entity's computer system through agent computing device, according to an example embodiment of the present disclosure. The fraud event database 136 and fraud rules 132 can be dynamically updated when utilized with a fraud management system (such as FMS 100) for monitoring user computing devices 150 for fraud events. One or more portion(s) of the method 200 can be implemented by a computing system that includes one or more computing devices such as, for example, the computing systems described with reference to the other figures (e.g., FMS 100, FMS computing system 110, agent computing device 150, Management Computing Device(s) 160, FMS management computing device 140, etc.). Each respective portion of the method 200 can be performed by any (or any combination) of one or more computing devices. Moreover, one or more portion(s) of the method 200 can be implemented as an algorithm on the hardware components of the device(s) described herein (e.g., as in FIGS. 1 and 4), for example, to manage and administer a fraud management system. FIG. 2 depicts functions performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 2 is described with reference to elements/terms described with respect to other systems and figures for exemplary illustrated purposes and is not meant to be limiting. One or more portions of method 300 can be performed additionally, or alternatively, by other systems.

At 202, the method 200 can include receiving and analyzing Agent Data 112 which is received by FMS Computing System 110 from Agent Computing Devices 150. The agent data (e.g., Agent Data 112), from the one or more agent computing devices (e.g., agent computing devices 150) based, at least in part, on one or more collection rules (e.g., collection rules 154).

At 204, method 200 can include determining an occurrence of an agent fraud event based, at least in part, on agent data 112 and the one or more fraud rules 132. For example, the FMS computing system 110 can be utilized to determine an occurrence of one or more agent fraud events 138. At 204 FMS Computing System 110 can compare Agent Data 112 to Fraud Rules 132. If FMS Computing System 110 determines that the Agent Data 112 meets or satisfies one or more of the Fraud Rules 132, the FMS Computing System 110 determines that an Agent Fraud Event 138 has occurred and method 200 proceeds to step 206. If FMS Computing System 110 determines that the Agent Data 112 does not meet or satisfy any of the Fraud Rules 132, method 200 returns to step 202.

At 206, method 200 can include determining a fraud severity level 207 for the Agent Fraud Event 138 identified at 204. Agent Fraud Event 138 is assigned a corresponding Fraud Severity Level 207 based upon the Fraud Rule 132 that was determined to have been met or satisfied at 204 by the Agent Data 112. The Fraud Severity Level 207 is the relative significance or severity of one Agent Fraud Event 138 compared to another. For example, the Fraud Severity Level 207 of each Agent Fraud Event is shown hereinabove in Table 1. At 206, FMS Computing system 110 can perform operations to identify a Fraud Severity Level 207 corresponding to the Agent Fraud Event 138 detected at 204 by using one or more processors to access and obtain data from Fraud Rules Database 125.

At 208, the method 200 can include comparing the severity level 207 determined at 206 to a Severity Level Threshold 209. Severity level threshold 209 is a predetermined fraud severity level at which company has determined the Agent Fraud Event 138 detected at 204 is a significant fraud threat which may require intervention. Such intervention can include FMS Computing System 110 performing operations to automatically update the fraud event database 136 and/or fraud rules 132. Intervention may also include FMS Computing System 110 or FMS Management Computing Devices 140 performing operations to initiating an agent quarantine procedure as more fully described with respect to step 212 of method 200.

At 208, when the severity level determined at 206 meets or exceeds the Severity Level Threshold 209, the Agent Fraud Event 138 detected at 204 is a significant fraud threat which necessitates or requires human or automated fraud intervention (e.g., by FMS Computing System 110 or FMS Management Computing Devices 140 initiating an agent quarantine procedure at step 212 of method 200). At 208 if Severity Level 207 meets or exceeds meets or exceeds the severity level threshold 209, method 200 proceeds to step 210.

At 210, method 200 includes transmitting data related to Agent Fraud Event 138 to Fraud Event Database 136. For example, at 210 FMS Computing system 110 can perform operations including transmitting data related to Agent Fraud Event 138 (e.g., such as the time of the fraud event occurred, the Agent Computer Device 150 from which the fraud event emanated, and the Fraud Rule 132 which was violated by the fraud event and the Fraud Severity Level 207 assigned to the fraud event) to Fraud Event Database 136. At 210 FMS Computing system 110 can also perform operations including storing the data related to Agent Fraud Event 138 within Fraud Event Database 136. Agent Fraud Event 138 data is stored and categorized within Fraud Event Database 136 based, at least in part, on the Agent Computing Device 150 from which the Agent Fraud Event 138 emanated.

At 212, method 200 includes causing one or more devices of FMS 100 to perform operations to quarantine an agent from the company and/or partner entity's computer systems. At 212 FMS Computing System 110 or FMS Management Computing Devices 140 can performing operations to initiating an agent quarantine procedure, which can automatically terminate an agent's access to certain programs or functions which are otherwise available at Agent Computing Device 150. Alternatively, an agent quarantine procedure may automatically terminate the agent's access to all information located on company's or partner entity's computer system. In other examples, quarantine procedure may automatically terminate agent's remote access to any database owned or maintained by company and/or partner entity, as more fully described with respect to step 212 of method 200.

At 214, the method 200 can include generating a fraud alert signal (e.g., fraud alert 165). Fraud Alert 165 can be transmitted to the Management Computing Devices 160 and/or FMS Management Computing Devices 140. Fraud Alert 165 can be an email or other notice transmitted from FMS Computing System 110 via network 170 to Management Computing Device 160 or FMS Management Computing Devices 140. Fraud Alert 165 provides information regarding the Agent Fraud Event 138, including the identity of the agent performing the Agent Fraud Event. In some embodiments, Fraud Alert 165 can be a visual or auditory indicator displayed on an interactive interface such as, for example, one or more display devices (e.g., with a respective user interface, etc.), or produced by one or more output devices (e.g., such as the respective user interface, one or more speakers, etc.) of Management Computing Device(s) 160.

Following execution of step 214, method 200 returns to step 202.

Now referring again to step 208 of method 200. At 208 when the severity level determined at 206 does not meet or exceed the Severity Level Threshold 209, the Agent Fraud Event 138 detected at 204 is not a fraud threat which, alone, necessitates or requires human or automated fraud intervention and method 200 proceeds to step 216.

At 216, method 200 includes accessing Fraud Event Database 136 and analyzing data stored within Fraud Event Database 136 to determine if Agent Computing Device 150 from which the fraud event detected at 204 emanated has caused or been the source of other or additional Agent Fraud Events 138 within a specified time (e.g., whether other fraud events have been caused within the last hour, during an agent's current work shift, or within the last day). If it is determined at 216 that Agent Computing Device 150 from which the fraud event detected at 204 emanated has caused any other or additional Agent Fraud Events 138 within a specified time period, the method 200 further includes determining, at 216, the Fraud Severity Level 207 for each and all such other or additional Agent Fraud Events 138.

At 218, method 200 includes generating an Aggregate Fraud Level 211. Aggregate Fraud Level 211 can be determined and generated by various methods, including FMS Computing System 110 calculating an average of each Fraud Severity Levels 207 identified at step 216 and at 206, all of which correspond to the Agent Computing Device 150 from which the fraud event detected at 204 emanated. Alternatively, the Aggregate Fraud Level 211 can be determined by calculating the sum of each Fraud Severity Level 207 identified at step 216 and at 206.

As 220, the method 200 can include comparing the Aggregate Fraud Level 211 determined at 218 to a Severity Level Threshold 209. At 220, when the Aggregate Fraud Level 211 determined at 218 meets or exceeds the Severity Level Threshold 209, the method proceeds to step 210 whereby the steps of method 200 can result in a dynamic or automated quarantine of an agent as described in step 212. At 220, when the Aggregate Fraud Level 211 determined at 218 does not meet or exceed the Severity Level Threshold 209, the method proceeds to step 222.

At 222, method 200 includes transmitting data related to Agent Fraud Event 138, detected at step 204, to Fraud Event Database 136. For example, at 222 FMS Computing system 110 can perform operations including transmitting data related to Agent Fraud Event 138, detected at step 204, (e.g., such as the time of the fraud event occurred, the Agent Computer Device 150 from which the fraud event emanated, and the Fraud Rule 132 which was violated by the fraud event and the Fraud Severity Level 207 assigned to the fraud event) to Fraud Event Database 136. At 222 FMS Computing system 110 can also perform operations including storing the data related to Agent Fraud Event 138, detected at step 204, within Fraud Event Database 136. Agent Fraud Event 138 data is stored and categorized within Fraud Event Database 136 based, at least in part, on the Agent Computing Device 150 from which the Agent Fraud Event 138 emanated.

Thereafter, method 200 proceeds to step 214, which has been previously detailed. Following execution of step 214, method 200 returns to step 202.

Figure 3:
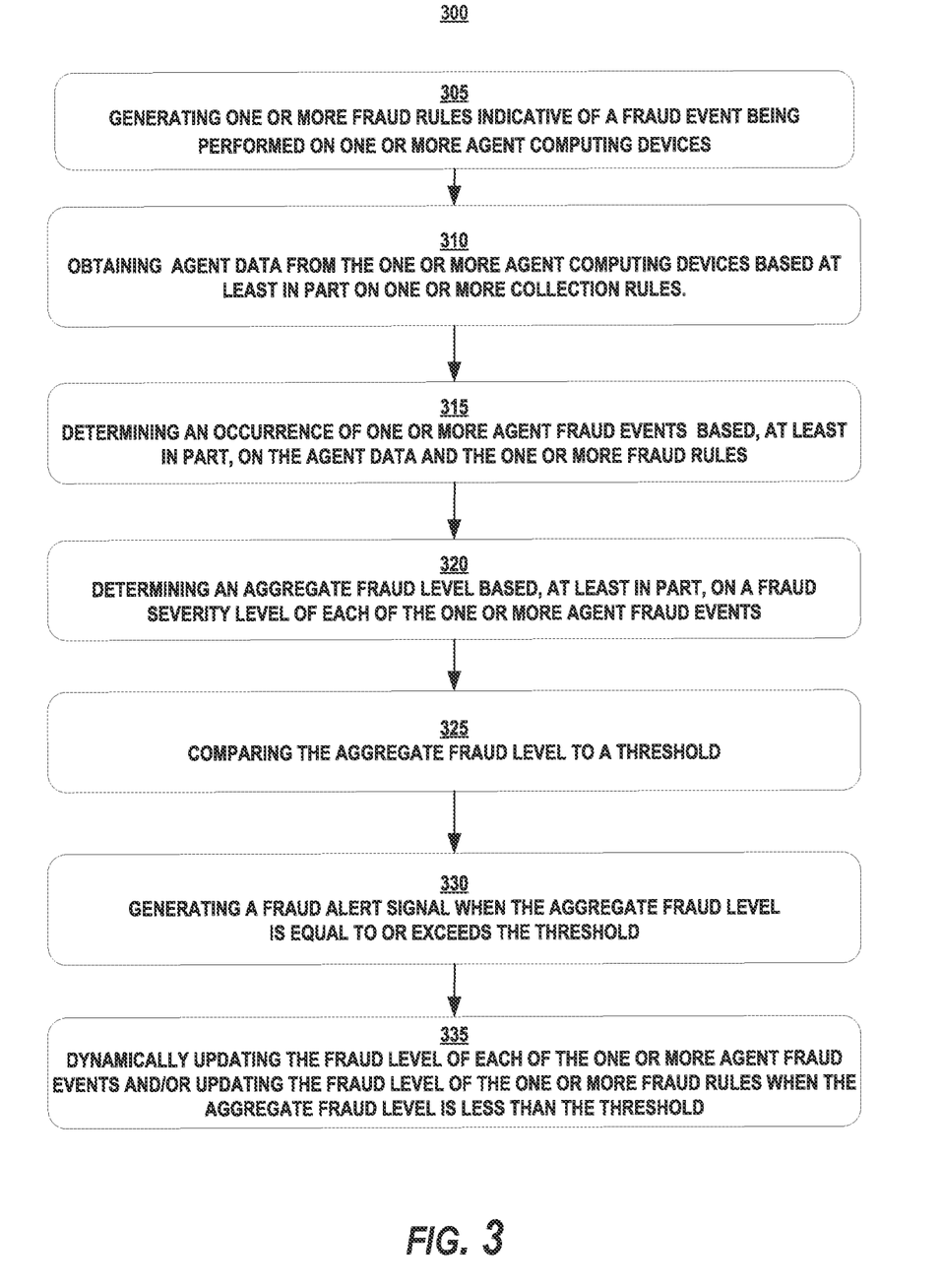
FIG. 3 depicts a flow chart diagram of a method for monitoring user computing devices for fraud events utilizing a fraud management system and dynamically updating the fraud severity level of the fraud rules according to example embodiments of the present disclosure.

Referring now generally to FIG. 3 of the present disclosure. FIG. 3 depicts a flow diagram 300 of a method for monitoring user computing devices for fraud events utilizing a fraud management system (such as FMS 100) according to example embodiments of the present disclosure. One or more portion(s) of the method 500 can be implemented by a computing system that includes one or more computing devices such as, for example, the computing systems described with reference to the other figures (e.g., FMS 100, FMS computing system 110, agent computing device 150, Management Computing Device(s) 160, FMS management computing device 140, etc.). Each respective portion of the method 300 can be performed by any (or any combination) of one or more computing devices. Moreover, one or more portion(s) of the method 300 can be implemented as an algorithm on the hardware components of the device(s) described herein (e.g., as in FIGS. 1 and 5), for example, to manage and administer a fraud management system. FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 3 is described with reference to elements/terms described with respect to other systems and figures for exemplary illustrated purposes and is not meant to be limiting. One or more portions of method 300 can be performed additionally, or alternatively, by other systems.

At 305, the method 300 can include generating one or more fraud rules (e.g, Fraud Rules 123) indicative of a fraud event being performed on an agent computing machine (e.g., agent computing device 150). For example, a FMS computing system (e.g., FMS Computing System 110) can obtain the fraud rules (e.g., fraud rules 123) indicative of a fraud event being performed on one or more agent computing devices (e.g., agent computing devices 150). FMS Computing System 110 can receive fraud rules from a FMS management computing device (e.g., device 140), through a network (e.g., network 170). The agent can be associated with one or more companies or partner entities and operate an agent computing device 150 which is capable of communicating or interaction with one or more company or partner entity computing devices. The payroll data can include deduction data indicative of whether a payroll deduction was made for a payroll period associated with the payroll data.

Fraud Rules 132 can be stored within Fraud Rules Database 125. The Fraud Rules 132 can be specifically tailored to a particular company or partner entity whose Agent Computing Devices 150 are being monitored by FMS 100. Fraud Rules 132 may be any pre-defined activity which is indicative of a fraud event that has been performed on an agent computing device 150. For example, a non-exhaustive list of Fraud Rules 132 and corresponding Agent Data 112 which would satisfy the Fraud Rules 132 is shown in Table 1 hereinabove.

At 310, the method 300 can include obtaining agent data (e.g., Agent Data 112), from the one or more agent computing devices (e.g., agent computing devices 150) based, at least in part, on one or more collection rules (e.g., collection rules 154). Collection Rules 154 can include gathering agent data 112 when agent computing devices 150 are operating Microsoft Windows native applications, including Notepad, calculator, or MS Office Suite, or internet-based applications (e.g., web browsers). can be based on specific programs which are being operated on the agent computing devices.

At 315, the method 300 can include determining an occurrence of one or more agent fraud events based, at least in part, on agent data 112 and the one or more fraud rules 132. For example, the FMS computing system 110 can be utilized to determine an occurrence of one or more agent fraud events 138. In some implementations, the computing system 110 can obtain the agent data 112 and obtain the fraud rules 132, for a plurality of company profiles 130. Each of the company profiles 130 can each include a unique set of fraud rules 132 associated and tailored to a company and/or partner entity.

At 315 FMS Computing System 110 can compares Agent Data 112 to Fraud Rules 132. If FMS Computing System 110 determines that the Agent Data 112 meets or satisfies one or more of the Fraud Rules 132, the FMS Computing System 110 determines that an Agent Fraud Event 138 has occurred. In response to the determination that an Agent Fraud Event 138 has occurred, FMS Computing System 110 can perform operations as further described in method 300.

At 320, the method 300 can include determining an aggregate fraud severity level based, at least in party, on a fraud severity level of each of the one or more agent fraud events 138. Each Agent Fraud Event 138 can be assigned a corresponding Fraud Severity Level 207 based upon the Fraud Rule 132 that has been meet or satisfied by the Agent Data 112. The Fraud Severity Level 207 is the relative significance or severity of one Agent Fraud Event 138 as compared to another. For example, the Fraud Severity Level 207 of each Agent Fraud Event is shown hereinabove in Table 1. At 320, FMS Computing system 110 can perform operations such as identifying a Fraud Severity Level 207 corresponding to each Agent Fraud Event 138. Thereafter, at 320 of method 300, an Aggregate Fraud Level 211 can be determined based on the Fraud Security Level 207 identified for each of the one or more Agent Fraud Events 138. The Aggregate Fraud Level 211 can be determined by various methods, including calculating an average of each identified Fraud Severity Level 207 corresponding to each Agent Fraud Event 138 that was determined at 315 as having occurred. Alternatively, the Aggregate Fraud Level 211 can be determined by calculating the sum of each identified Fraud Severity Level 207 corresponding to each Agent Fraud Event 138 that was determined at 315 as having occurred.

At 325, the method 300 can include comparing the aggregate fraud level 211 to a severity level threshold 209. Severity level threshold 209 represents a predetermined amount at which company has determined that one or more of the Agent Fraud Events 138 are significant and e.g., necessitate or justify receipt of a fraud alert to an employee manager of company or partner entity and/or necessitate or justify human or automated fraud intervention by (e.g., by FMS Computing System 110 or FMS Management Computing Devices 140).

At 330, the method 300 can include generating a fraud alert signal (e.g., fraud alert 165) when it is determined at 325 that the aggregate fraud level 211 meets or exceeds the severity level threshold. Fraud Alert 165 can be transmitted to the Management Computing Devices 160 and/or FMS Management Computing Devices 140. Fraud Alert 165 can be an email or other notice transmitted from FMS Computing System 110 via network 170 to Management Computing Device 160 or FMS Management Computing Devices 140. Fraud Alert 165 provides information regarding the Agent Fraud Event 138, including the identity of the agent performing the Agent Fraud Event. In some embodiments, Fraud Alert 165 can be a visual or auditory indicator displayed on an interactive interface such as, for example, one or more display devices (e.g., with a respective user interface, etc.), or produced by one or more output devices (e.g., such as the respective user interface, one or more speakers, etc.) of Management Computing Device(s) 160.

At 330, if it is determined at 325 that the aggregate fraud level 211 is less than the severity level threshold, method 300 proceeds to step 335.

At 335, method 300 can include dynamically updating or adjusting the Fraud Severity Level 207 of each of the one or more identified Agent Fraud Events 138 which were used in determining the aggregate fraud level 211. For example, Fraud Rule "Time Access Rule-A" is initially assigned a fraud severity level 207 of "4." If the initial fraud severity level 207 of "4" for "Time Access Rule-A" is utilized to determine the aggregate fraud level 211 at 320, then at 335 of method 300 the fraud severity level of "Time Access Rule-A" is dynamically and automatically adjusted by a Predetermined Severity Increment. The Predetermined Severity Increment can be any amount determined by the company and can be unique for each Fraud Rule. For example, Predetermined Severity Increment associated with Fraud Rule "Time Access Rule-A" of Table 1 can be "0.5," while Predetermined Severity Increment associated with Fraud Rule "Time Access Rule-B" of Table 1 can be "0.2." The Predetermined Severity Increment can be applied to each Fraud Rule upon each occurrence of an Agent Fraud Event during execution of method 300. For example, if Agent Data is determined to include two Agent Fraud Events which are based on Fraud Rule "Time Access Rule-A" at 335, Fraud Severity Level 207 of Fraud Rule "Time Access Rule-A" can be dynamically adjusted (i.e., increased) by a 1 (i.e., two adjustments based on predetermined severity increment of "0.5"). In this way, when an agent engages in repetitive Agent Fraud Events with Fraud Severity Levels, which may not initially meet the Aggregate Fraud Severity Level, this repetitive fraudulent behavior can exceed the Aggregate Fraud Severity Threshold after it is performed on a plurality of instances.

Figure 4:
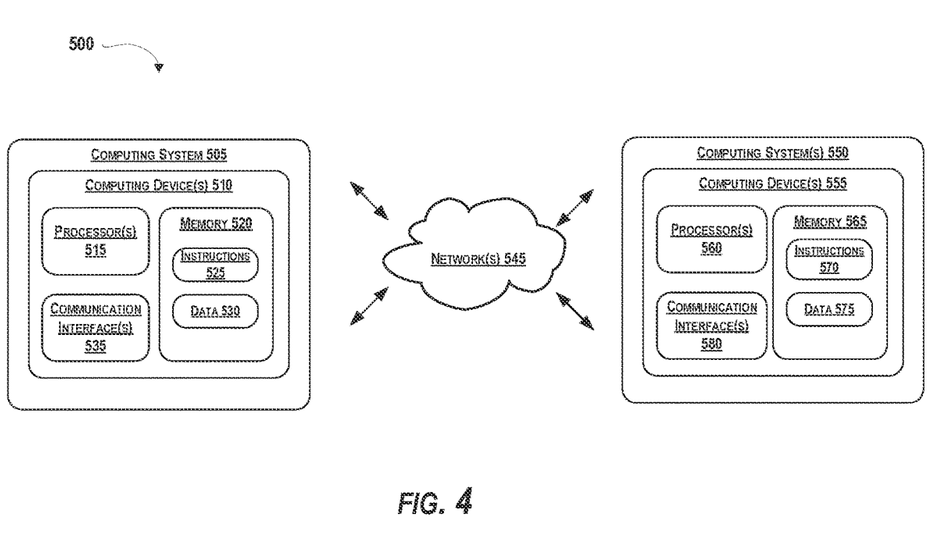
FIG. 4 depicts a block diagram of a computing system according to example embodiments of the present disclosure.

FIG. 4 depicts a block diagram of an example computing system 500 that can be used to implement the systems and methods for fraud management according to example embodiments of the present disclosure. The example system 500 can include the computing system 505 (e.g., fraud management computing system 110) and the computing system 550 (e.g., Management Computing Devices 160, FMS Management Computing Device 140, and Agent Computing Devices 150 of FIG. 1), etc. that are communicatively coupled over one or more network(s) 545.

The computing system 505 can include one or more computing device(s) 510 (e.g., fraud management computing system 110). The computing device(s) 510 of the computing system 505 can include processor(s) 515 and a memory 520. The one or more processors 515 can be any suitable processing device (e.g., a processor core, a microprocessor, an ASIC, a FPGA, a controller, a microcontroller, etc.) and can be one processor or a plurality of processors that are operatively connected. The memory 520 can include one or more non-transitory computer-readable storage media, such as RAM, ROM, EEPROM, EPROM, one or more memory devices, flash memory devices, etc., and combinations thereof.

The memory 520 can store information that can be accessed by the one or more processors 515. For instance, the memory 520 (e.g., one or more non-transitory computer-readable storage mediums, memory devices) can include computer-readable instructions 525 that can be executed by the one or more processors 515. The instructions 525 can be software written in any suitable programming language or can be implemented in hardware. Additionally, or alternatively, the instructions 525 can be executed in logically and/or virtually separate threads on processor(s) 515. The instructions 525 can be instructions to compare agent data (e.g., Agent Data 112 of FIG. 1) to fraud rules (e.g., Fraud Rules 132 of FIG. 1).

For example, the memory 520 can store instructions 525 that when executed by the one or more processors 515 cause the one or more processors 515 to perform operations such as any of the operations and functions for which the computing systems are configured, as described herein.

The memory 520 can store data 530 that can be obtained, received, accessed, written, manipulated, created, and/or stored. The data 530 can include, for instance, the agent data (e.g., Agent Data 112 of FIG. 1), fraud rules (e.g., Fraud Rules 132 of FIG. 1), fraud event database (e.g., fraud event database 136 of FIG. 1), and/or any other data described herein. In some implementations, the computing device(s) 510 can obtain from and/or store data in one or more memory device(s) that are remote from the computing system 505 such as one or more memory devices of the computing system 550 (e.g., Management Computing Devices 160, FMS Management Computing Device 140, and Agent Computing Devices 150 of FIG. 1).

The computing device(s) 510 can also include a communication interface 535 used to communicate with one or more other system(s) (e.g., computing system 550). The communication interface 535 can include any circuits, components, software, etc. for communicating via one or more networks (e.g., 545). In some implementations, the communication interface 535 can include for example, one or more of a communications controller, receiver, transceiver, transmitter, port, conductors, software and/or hardware for communicating data/information.

The computing system 550 can include one or more computing devices 555. The one or more computing devices 555 can include one or more processors 560 and a memory 565. The one or more processors 560 can be any suitable processing device (e.g., a processor core, a microprocessor, an ASIC, a FPGA, a controller, a microcontroller, etc.) and can be one processor or a plurality of processors that are operatively connected. The memory 565 can include one or more non-transitory computer-readable storage media, such as RAM, ROM, EEPROM, EPROM, one or more memory devices, flash memory devices, etc., and combinations thereof.

The memory 565 can store information that can be accessed by the one or more processors 560. For instance, the memory 565 (e.g., one or more non-transitory computer-readable storage mediums, memory devices) can store data 575 that can be obtained, received, accessed, written, manipulated, created, and/or stored. The data 575 can include, for instance, collection rules (e.g., Collection Rules 154 of FIG. 1), agent data gatherer software (e.g., agent data gatherer 152 of FIG. 1) and/or other data or information described herein. In some implementations, the computing system 550 can obtain data from one or more memory device(s) that are remote from the computing system 550.

The memory 565 can also store computer-readable instructions 570 that can be executed by the one or more processors 560. The instructions 570 (e.g., Collection Rules 154 or agent data gatherer 152 of FIG. 1) can be software written in any suitable programming language or can be implemented in hardware. Additionally, or alternatively, the instructions 570 can be executed in logically and/or virtually separate threads on processor(s) 560. For example, the memory 565 can store instructions 570 that when executed by the one or more processors 560 cause the one or more processors 560 to perform any of the operations and/or functions described herein, including, for example, any of the operations and functions of the devices described herein, and/or other operations and functions.

The computing device(s) 555 can also include a communication interface 580 used to communicate with one or more other system(s). The communication interface 580 can include any circuits, components, software, etc. for communicating via one or more networks (e.g., 545). In some implementations, the communication interface 580 can include for example, one or more of a communications controller, receiver, transceiver, transmitter, port, conductors, software and/or hardware for communicating data/information.

The network(s) 545 (e.g., network 170 of FIG. 1) can be any type of network or combination of networks that allows for communication between devices. In some embodiments, the network(s) 545 can include one or more of a local area network, wide area network, the Internet, secure network, cellular network, mesh network, peer-to-peer communication link and/or some combination thereof and can include any number of wired or wireless links. Communication over the network(s) 545 can be accomplished, for instance, via a network interface using any type of protocol, protection scheme, encoding, format, packaging, etc.

The technology discussed herein makes reference to servers, databases, software applications, and other computer-based systems, as well as actions taken, and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel. Furthermore, computing tasks discussed herein as being performed at a server can instead be performed at a user device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A fraud management system comprising:
    an agent data gatherer operable with a plurality of agent computing devices for collecting and transmitting agent activity data from each of the plurality of agent computing devices, wherein said collecting and transmitting of agent activity data occurs in real-time with the occurrence of one or more agent computing commands corresponding to said agent activity data;
    a fraud rules database containing one or more fraud rules;
    a fraud management computing system in communication with the agent data gatherer and the fraud rules database, wherein the fraud management computing system includes, one or more processors and one or more memory devices, the one or more memory devices configured to store the one or more fraud rules and store instructions that when executed by the one or more processors cause the one or more processors to perform operations, the operations comprising:
        obtaining the agent activity data transmitted by the agent data gatherer;
        comparing the agent activity data to the one or more fraud rules;
        determining whether one or more agent fraud events have occurred based, at least in part, on the comparison;
        providing a fraud alert based upon each of the one or more agent fraud events;
        determining, based on the one or more fraud rules, a fraud severity level for each of the one or more agent fraud events; and
        adjusting the fraud severity level for each of the one or more fraud rules by one or more severity increments.

2. The fraud management system of claim 1, wherein the data gatherer includes software installed on each of the plurality of agent computing devices which collects the agent activity data based, at least in part, on one or more collection rules.

3. The fraud management system of claim 2, wherein the one or more collection rules are based on a plurality of agent inputs that may be received by any one of the plurality of agent computing devices.

4. The fraud management system of claim 3, wherein the one or more fraud rules are based on the one or more agent computing commands, which are symptomatic of one of the agent fraud events being performed on one or more of the agent computing devices.

5. The fraud management system of claim 4, wherein a fraud severity level corresponds to each of the fraud rules and wherein the operations executed by the one or more processors further comprises:
    determining if the fraud severity level corresponding to any of the one or more agent fraud events exceeds a severity level threshold.

6. The fraud management system of claim 5, wherein when the fraud severity level corresponding to one or more agent fraud events is equal to or exceeds the severity level threshold, the operations executed by the one or more processors further comprise:
    generating a quarantine command; and
    transmitting the quarantine command to one or more of the agent computing devices.

7. The fraud management system of claim 6, wherein a fraud severity level corresponds to each of the fraud rules and wherein the operations executed by the one or more processors further comprise:
    comparing the fraud severity level for each of the one or more agent fraud events to a severity level threshold;
    generating an aggregate fraud level when the fraud severity level for all of the agent fraud events is less than the severity level threshold;
    comparing the aggregate fraud level to the severity level threshold;
    generating a quarantine command when the aggregate fraud level meets or exceeds the severity level threshold; and
    transmitting the quarantine command to one or more of the agent computing devices.

8. The fraud management system of claim 7, wherein the aggregate fraud level comprises the sum of the fraud severity levels for each of the one or more agent fraud events and wherein the one or more severity increments are unique for each of the one or more fraud rules.

9. The fraud management system of claim 4, wherein the one or more severity increments are a unique amount applicable to each of the one or more fraud rules and wherein the operations executed by the one or more processors further comprise:
    comparing the fraud severity level for each of the one or more fraud events to a severity level threshold;
    generating an aggregate fraud level when the fraud severity level for all of the agent fraud events is less than the severity level threshold;
    comparing the aggregate fraud level to the severity level threshold;
    determining a number of occurrences of each of the one or more fraud events; and
    increasing the fraud severity level corresponding to each of the one or more agent fraud events when the aggregate fraud level is less than the severity level threshold, wherein increasing the fraud severity level corresponding to each of the one or more fraud events is based on the number of occurrences of each of the one or more fraud events, and the unique amount of the severity increment applicable to each of the one or more agent fraud rules.

10. A computer-implemented method, the method comprising:
    generating, by a computing system comprising one or more computing devices, one or more fraud rules;
    obtaining, by the computing system, agent activity data from a plurality of agent computing devices, where the agent activity data is obtained based, at least in part, on one or more collection rules;
    comparing the agent activity data to the one or more fraud rules;
    determining an occurrence of one or more agent fraud events based, at least in part, on a comparison of the agent activity data and the one or more fraud rules; and
    providing a fraud alert based upon each of the one or more agent fraud events;
    obtaining a fraud severity level corresponding to each of the fraud rules, wherein the fraud severity level is a predetermined amount corresponding to each of the one or more fraud rules;

determining, by the computing system, a fraud severity level for each of the one or more agent fraud events based on the fraud severity level corresponding to each of the fraud rules; and adjusting the fraud severity level for each of the one or more fraud rules by one or more severity increments.

11. The computer-implemented method of claim 10, wherein the one or more collection rules are based on a plurality of agent inputs that may be received by any one of the plurality of agent computing devices and wherein said collecting of agent activity data occurs in real-time with the occurrence of each of the plurality of agent inputs.

12. The computer-implemented method of claim 11, wherein the one or more fraud rules are based on one or more agent computing commands, which are symptomatic of one of the agent fraud events being performed on one or more of the plurality of the agent computing devices.

13. The computer-implemented method of claim 12, wherein the method further comprises:
determining if the fraud severity level corresponding to any of the one or more agent fraud events exceeds a severity level threshold.

14. The computer-implemented method of claim 13, wherein when the fraud severity level corresponding to one or more agent fraud events is equal to or exceeds the severity level threshold, the method further comprises:
generating a quarantine command; and
transmitting the quarantine command to one or more of the agent computing devices.

15. The computer-implemented method of claim 12, wherein the method further comprises:
comparing the fraud severity level for each of the one or more agent fraud events to a severity level threshold;
generating an aggregate fraud level when the fraud severity level for all of the agent fraud events is less than the severity level threshold;
comparing the aggregate fraud level to the severity level threshold;
generating a quarantine command when the aggregate fraud level meets or exceeds the severity level threshold;
transmitting the quarantine command to one or more of the plurality of agent computing devices.

16. The computer-implemented method of claim 15, wherein the aggregate fraud level comprises the sum of the fraud severity levels for each of the one or more agent fraud events, wherein the one or more severity increments are unique for each of the one or more fraud rules and wherein the method further comprises:
determining a number of occurrences of each of the one or more fraud events; and
increasing the fraud severity level corresponding to each of the one or more agent fraud events when the aggregate fraud level is less than the severity level threshold, wherein increasing the fraud severity level corresponding to each of the one or more fraud events is based on the number of occurrences of each of the one or more fraud events, and the unique amount of the severity increment applicable to each of the one or more agent fraud rules.

17. The computer-implemented method of claim 15, wherein the aggregate fraud level comprises the average of the fraud severity levels for each of the one or more agent fraud events, wherein the one or more severity increments are unique for each of the one or more fraud rules and wherein the method further comprises:
determining a number of occurrences of each of the one or more fraud events; and
increasing the fraud severity level corresponding to each of the one or more agent fraud events when the aggregate fraud level is less than the severity level threshold, wherein increasing the fraud severity level corresponding to each of the one or more fraud events is based on the number of occurrences of each of the one or more fraud events, and the unique amount of the severity increment applicable to each of the one or more agent fraud rules.

18. The computer-implemented method of claim 12, wherein the method further comprises:
generating a fraud verification signal; and
the adjusting of the fraud severity level corresponding to each of the one or more agent fraud events is based upon receipt of a user response to the fraud verification signal.

19. One or more tangible, non-transitory computer-readable media storing computer-readable instructions that when executed by one or more processors cause the one or more processors to perform operations, the operations comprising:
generating, by a computing system comprising one or more computing devices, one or more fraud rules;
obtaining, by the computing system, agent activity data from a plurality of agent computers, where the agent activity data is obtained based, at least in part, on one or more collection rules;
determining an occurrence of one or more agent fraud events based, at least in part, on a comparison of the agent activity data and the one or more fraud rules; and
providing, by the computing system, data indicative of the one or more agent fraud events;
determining, based on the one or more fraud rules, a fraud severity level for each of the one or more agent fraud events;
generating a fraud verification signal;
receiving a user input responsive to said fraud verification signal; and
the adjusting of the fraud severity level corresponding to each of the one or more agent fraud events is based upon said user input and one or more severity increments for each of the one or more fraud rules by one or more severity increments, wherein the one or more severity increments are unique for each of the one or more fraud rules.

* * * * *